United States Patent
Lee et al.

(10) Patent No.: US 8,189,660 B2
(45) Date of Patent: May 29, 2012

(54) BIT RATE CONTROL METHOD AND APPARATUS

(75) Inventors: Yun-gu Lee, Yongin-si (KR);
Byung-cheol Song, Suwon-si (KR);
Nak-hoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1099 days.

(21) Appl. No.: 12/055,660

(22) Filed: Mar. 26, 2008

(65) Prior Publication Data
US 2009/0046778 A1 Feb. 19, 2009

(30) Foreign Application Priority Data
Aug. 17, 2007 (KR) .......................... 10-2007-0083018

(51) Int. Cl.
*H03D 3/24* (2006.01)
(52) U.S. Cl. .................................. 375/240.02
(58) Field of Classification Search .................. None
See application file for complete search history.

(56) References Cited

U.S. PATENT DOCUMENTS

| 6,690,833 | B1 | 2/2004 | Chiang et al. |
| 7,194,035 | B2 | 3/2007 | Dumitras et al. |
| 7,623,720 | B2 * | 11/2009 | Kashiwagi ................. 382/239 |
| 2005/0047504 | A1 * | 3/2005 | Sung et al. ............... 375/240.2 |
| 2005/0254576 | A1 * | 11/2005 | Huang ..................... 375/240.03 |
| 2008/0240233 | A1 * | 10/2008 | Au et al. ................. 375/240.02 |

FOREIGN PATENT DOCUMENTS
EP 1045590 A3 3/2005
* cited by examiner

*Primary Examiner* — Chirag Shah
*Assistant Examiner* — Amar Persaud
(74) *Attorney, Agent, or Firm* — Sughrue Mion, PLLC

(57) ABSTRACT

Provided are a bit rate control method and apparatus for intra-only coding, the method including calculating a similarity between at least one block group from among block groups including a plurality of macroblocks in a current frame to be encoded and at least one block group in a previous frame, which corresponds to the at least one block group in the current frame, determining a target bit amount of a current block group including a current macroblock using a video characteristic of the previous frame if the calculated similarity is greater than a threshold value, determining a target bit amount of the current macroblock based on the determined target bit amount of the current block group, and calculating a quantization parameter of the current macroblock based on the determined target bit amount of the current macroblock and the amount of bits generated for up to a previous macroblock.

19 Claims, 7 Drawing Sheets

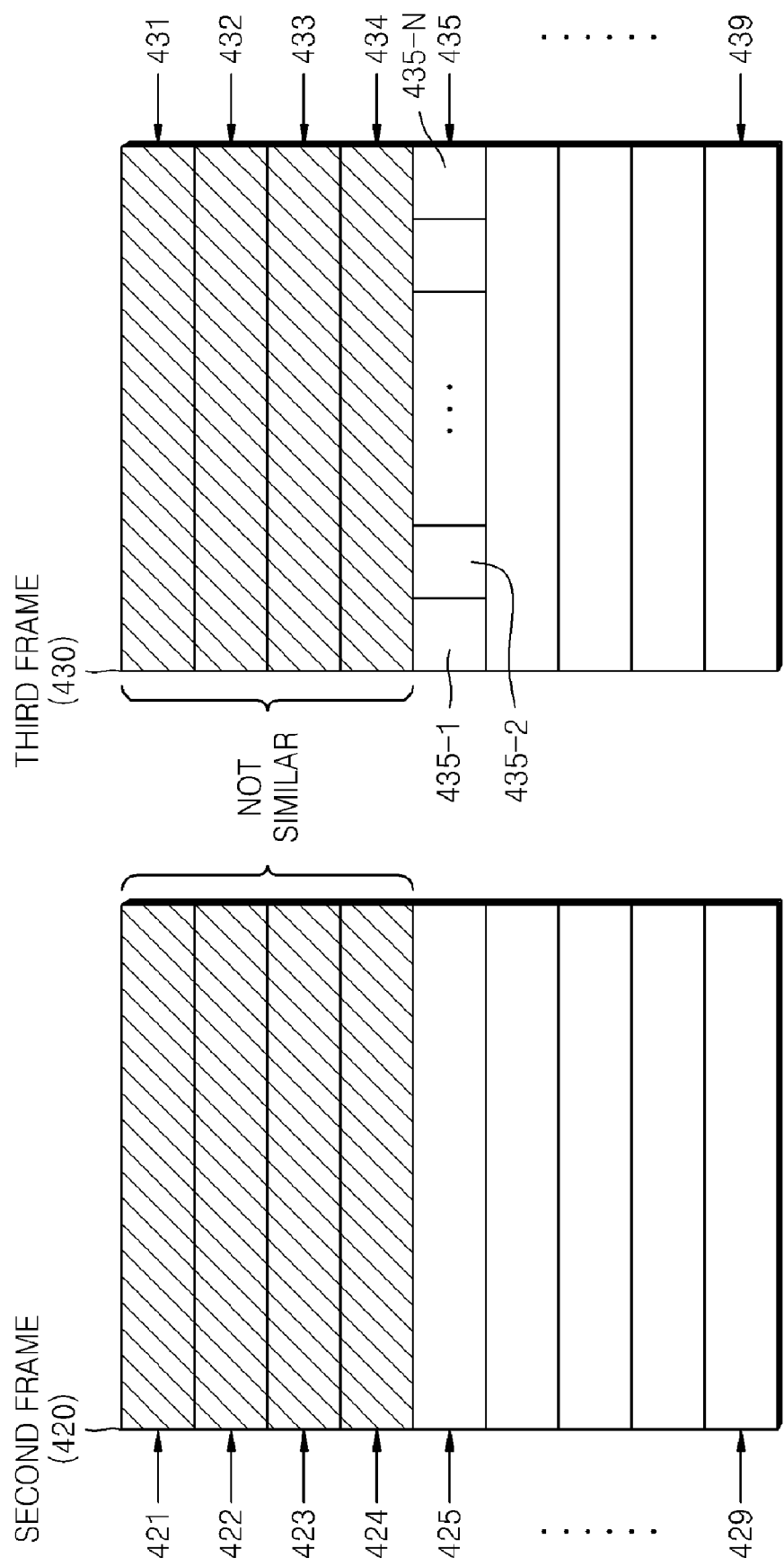

BIT RATE CONTROL METHOD AND APPARATUS

CROSS-REFERENCE TO RELATED PATENT APPLICATION

This application claims priority from Korean Patent Application No. 10-2007-0083018, filed on Aug. 17, 2007, in the Korean Intellectual Property Office, the disclosure of which is incorporated herein in its entirety by reference.

BACKGROUND OF THE INVENTION

1. Field of the Invention

The present invention generally relates to bit rate control, and more particularly, to a bit rate control for intra-only coding.

2. Description of the Related Art

The H.264 High 4:4:4 profile establishes a method for coding all pictures in a video sequence using intra pictures by separately defining the High 4:4:4 intra-only profile. Intra-only coding can be employed especially in fields such as medicine requiring an image having the same or higher resolution and display quality as a high definition (HD)-class image, an image editing system, a professional camcorder, and the like. A real-time video transmission system requiring low delay and low latency is also one of the fields of intra-only coding.

There are many constraints on bit rate control in the real-time video transmission system since the real-time video transmission system has to encode an input image in real-time with no or low delay. For this reason, it is difficult to apply inter-coding requiring a delay of at least 1 frame to the real-time video transmission system, and thus intra-coding is generally performed in the real-time video transmission system.

In this case, a bitstream having a fixed bit rate is generated. Although an average bit rate can be tuned to a fixed target bit rate by adjusting a quantization parameter (QP), it is difficult to make an instant bit rate, which is generated instantly, constant during a short period of time because the instant bit rate is variable. Thus, a bit rate is adjusted with some delay in transmission of a generated bitstream using a buffer that temporally stores bitstreams.

For example, at a certain point in time, if a small number of bits are generated, a previously generated bitstream is transmitted. On the other hand, if a large number of bits are generated, some of the generated bits are stored in the buffer. As such, in the related art, transmission of the bitstream is adjusted to the fixed target bit rate using the buffer.

However, such a method of adjusting transmission of a bitstream to a fixed target bit rate using a buffer is likely to cause underflow or overflow. For example, underflow occurs if a bitstream having a less number of bits than a threshold value is generated during a particular period of time and thus an extra bitstream remaining in the buffer is completely transmitted. On the other hand, overflow occurs if a bitstream having a greater number of bits than the threshold value is generated during the particular period of time and thus an additionally generated bitstream fails to be completely transmitted. The size of the buffer may be increased in order to prevent underflow or overflow, however bitstream transmission is delayed by the increase in size of the buffer. Thus, the increase in the size of the buffer is not suitable for the real-time video transmission system.

A related art bit rate control method controls a bit rate by increasing a QP or by macroblock-based skip or frame-based skip in the case of overflow and controls the bit rate by reducing the QP or inserting a null packet by a buffer control unit in the case of underflow. Thus, overflow may degrade image quality and underflow may waste channel capacity. In particular, overflow may cause more of a serious problem than with underflow in intra-only coding. In intra-only coding, overflow has to be addressed only by adjusting the QP because macroblock-based skip radically degrades display quality. However, the QP has to be sharply changed in order to prevent overflow, and thus failing to perfectly solve display quality degradation.

If the characteristics of an input image can be recognized in order to predict the amount of generated bits for each macroblock, display quality degradation may be solved with the prevention of overflow or underflow. However, in a real-time encoder, a delay in the input image is inevitable so as to be able to recognize the characteristics of the input image.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Aspects of the present invention provide a bit rate control method and apparatus in which a bitstream having a fixed bit rate is generated by preventing underflow or overflow of a buffer when an input image is encoded in real-time using intra-only coding with no delay.

According to one aspect of the present invention, there is provided a bit rate control method including calculating a similarity between at least one block group from among block groups including a plurality of macroblocks in a current frame to be encoded and at least one block group in a previous frame, which corresponds to the at least one block group in the current frame, determining a target bit amount of a current block group including a current macroblock using a video characteristic of the previous frame if the calculated similarity is greater than a predetermined threshold value, determining a target bit amount of a current macroblock based on the determined target bit amount of the current block group, and calculating a QP of the current macroblock based on the determined target bit amount of the current macroblock and the amount of bits generated for up to a previous macroblock.

The video characteristic of the previous frame may be a complexity of the previous frame, and the determination of the target bit amount of the current block group may include comparing the complexity of the previous frame with a complexity of the current block group or a previous block group in order to determine the target bit amount of the current block group.

The determination of the target bit amount of the current block group may include calculating a ratio between the complexity of the previous frame and the complexity of the current block group and determining the target bit amount of the current block group according to the calculated ratio.

The bit rate control method may further include adjusting the QP of the current macroblock to a value that is most approximate to the calculated QP of the current macroblock from among the values within a predetermined threshold value from an average QP of the previous frame.

The calculation of the similarity may include calculating a first sum of complexities of a plurality of macroblocks included in at least one block group that precedes the current block group, calculating a second sum of complexities of a plurality of macroblocks included in at least one block group in the previous frame, which corresponds to the at least one block group in the current frame, and calculating a difference between the first sum and the second sum.

The complexities of the macroblocks may be gradients of the macroblocks.

The macroblocks included in the block group may be located in the same horizontal row in the same frame.

The determination of the target bit amount of the current macroblock may include determining some of the determined target bit amount of the current block group as the target bit amount of the current macroblock based on complexities of a plurality of macroblocks included in the current block group.

The calculation of the QP of the current block group may include calculating the QP of the current macroblock further based on the fullness of a buffer to temporarily store a generated bitstream.

According to another aspect of the present invention, there is provided a bit rate control apparatus including a similarity calculation unit, a group-based target bit amount determination unit, a block-based target bit amount determination unit, and a QP calculation unit. The similarity calculation unit calculates a similarity between at least one block group from among block groups including a plurality of macroblocks in a current frame to be encoded and at least one block group in a previous frame, which corresponds to the at least one block group in the current frame. The group-based target bit amount determination unit determines a target bit amount of a current block group including a current macroblock using a video characteristic of the previous frame if the calculated similarity is greater than a predetermined threshold value. The block-based target bit amount determination unit determines a target bit amount of a current macroblock based on the determined target bit amount of the current block group. The QP calculation unit calculates a QP of the current macroblock based on the determined target bit amount of the current macroblock and the amount of bits generated for up to a previous macroblock.

BRIEF DESCRIPTION OF THE DRAWINGS

The above and other features of the present invention will become more apparent by describing in detail exemplary embodiments thereof with reference to the attached drawings in which:

FIGS. 4A through 4C are diagrams for explaining bit rate control according to exemplary embodiments of the present invention;

DETAILED DESCRIPTION OF EXEMPLARY EMBODIMENTS OF THE INVENTION

Figure 1:
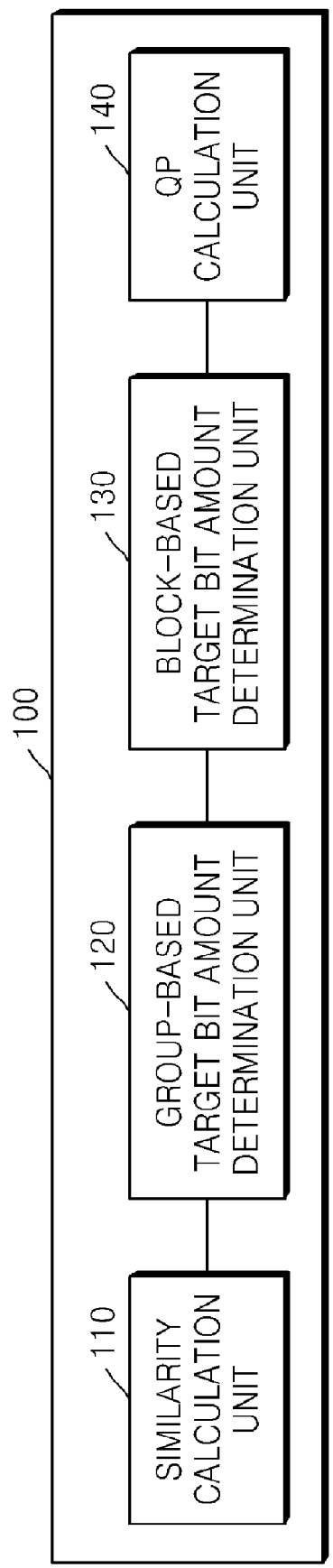
FIG. 1 is a block diagram of a bit rate control apparatus according to an exemplary embodiment of the present invention.

Hereinafter, exemplary embodiments of the present invention will be described in detail with reference to the accompanying drawings. It should be noted that like reference numerals refer to like elements illustrated in one or more of the drawings. In the following description of the present invention, detailed description of known functions and configurations incorporated herein will be omitted for conciseness and clarity.

FIG. 1 is a block diagram of a bit rate control apparatus 100 according to an exemplary embodiment of the present invention.

Referring to FIG. 1, the bit rate control apparatus 100 includes a similarity calculation unit 110, a group-based target bit determination unit 120, a block-based target bit amount determination unit 130, and a QP calculation unit 140.

The similarity calculation unit 110 calculates a similarity between at least one block group from among block groups including a plurality of macroblocks of a current frame and at least one block group of a previous frame, which corresponds to the at least one block group. In the current exemplary embodiment of the present invention, macroblocks included in a block group may be located in the same row of the same frame. In other exemplary embodiments of the present invention, macroblocks included in a block group may correspond to the same slice. The similarity calculation unit 110 will be described later in more detail with reference to FIG. 3.

The group-based target bit amount determination unit 120 determines a target bit amount of a current block group including a current macroblock using a video characteristic of the previous frame when the similarity calculated by the similarity calculation unit 110 is greater than a predetermined threshold value. Herein, the current macroblock means a macroblock to be encoded and the current block group means a block group including the current macroblock.

The video characteristic of the previous frame may be the complexity of the previous frame. When the calculated similarity calculated by the similarity calculation unit 110 is greater than the predetermined threshold value, the group-based target bit amount determination unit 120 may compare the complexity of the previous frame with the complexity of the current block group or the complexity of a previous block group that immediately precedes the current block group in order to determine the target bit amount of the current block group. In particular, the group-based target bit amount determination unit 120 may calculate a ratio between the complexity of the previous frame and the complexity of the current block group and determine the target bit amount of the current block group according to the calculated ratio.

In intra-only coding, the complexity of the current frame cannot be calculated in advance when an input image is encoded in real-time with no delay. However, when the similarity calculated by the similarity calculation unit 110 is greater than the predetermined threshold value, it can be determined that the current frame and the previous frame have similar video characteristics. Thus, the target bit amount of the current block group can be determined using the complexity of the previous frame. Herein, the complexity of a frame means a sum of complexities of macroblocks included in the frame and the complexity of a block group means a sum of complexities of macroblocks included in the block group.

For example, for a case where the similarity calculated by the similarity calculation unit 110 is greater than the predetermined threshold value, it is assumed that the complexity of the previous frame is 100 and the complexity of the current block group is 10. Since the calculated similarity is greater than the predetermined threshold value, it can be determined that a video characteristic of the current frame is similar to that of the previous frame. In this sense, the complexity of the current frame may approximately be 100 and thus 10/100 of the target bit amount assigned to the current frame may be assigned to the current block group. When the target bit amount of the current frame is 100 bits, 10 bits may be assigned to the current block group.

In a system where the current block group is loaded in a memory before encoding, video information regarding the current block group can be known in advance prior to encoding. However, when the video information regarding the current block group cannot be known in advance, the target bit amount of the current block group can be assigned using the complexity of the previous block group that immediately precedes the current block group since it is expected that the previous block group and the current block group have similar video characteristics because a video characteristic generally has continuity.

When the similarity calculated by the similarity calculation unit 110 is less than the predetermined threshold, it can be determined that the video characteristic of the current frame is not similar to that of the previous frame. In other words, the video characteristic of the previous frame cannot be used to assign the target bit amount of the current block group. In this case, an average target bit amount of block groups may be determined as the target bit amount of the current block group. When the target bit amount of the current frame is "100" bits and the current frame is composed of "5" block groups, the target bit amount of the current block group may be "100 bits/5", i.e., "20" bits.

The block-based target bit amount determination unit 130 determines a target bit amount of the current macroblock based on the target bit amount of the current block group.

When video information regarding the current block group can be known in advance like in a system where a block group to be encoded is loaded in a memory before encoding, some of the target bit amount of the current block group is determined as the target bit amount of the current macroblock based on the complexities of a plurality of macroblocks included in the current block group. In other words, a higher target bit amount may be assigned for the high complexity of the current macroblock and a lower target bit amount may be assigned for the low complexity of the current macroblock. The complexity of a macroblock may be defined as the gradient of the macroblock as will be described with reference to FIG. 3, however the present invention is not limited thereto.

However, when the video information regarding the current block group cannot be known in advance, the target bit amount of the current block group is equally assigned to macroblocks included in the current block group, thereby determining the target bit amount of the current macroblock. In this case, the current macroblock is assigned the same target bit amount as that of the other macroblocks included in the current block group regardless of its complexity.

The QP calculation unit 140 calculates a QP of the current macroblock based on the determined target bit amount of the current macroblock and the amount of bits generated for up to the previous macroblock.

The bit rate control apparatus 100 may further include a buffer (not shown) to temporarily store a generated bitstream. In this case, the QP calculation unit 140 may calculate the QP of the current macroblock based on the target bit amount of the current macroblock, the amount of bits generated for up to the previous macroblock, and the fullness of the buffer.

Figure 2:
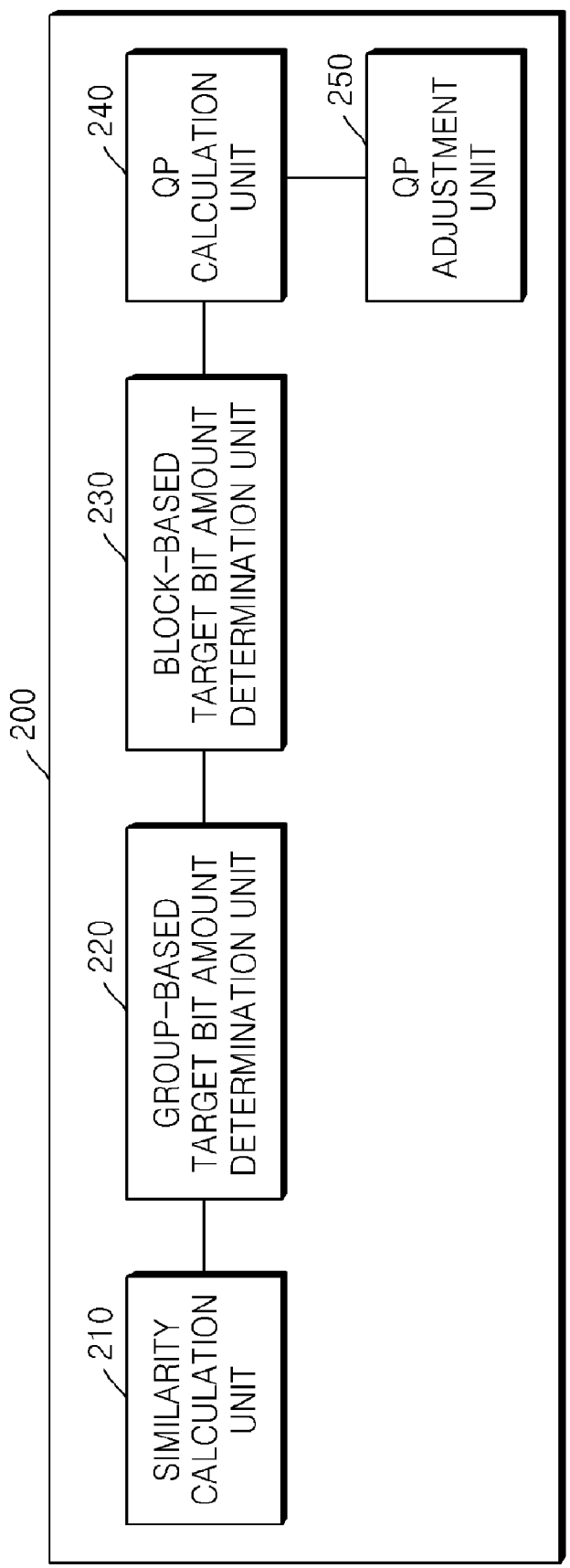
FIG. 2 is a block diagram of a bit rate control apparatus according to another exemplary embodiment of the present invention.

FIG. 2 is a block diagram of a bit rate control apparatus 200 according to another exemplary embodiment of the present invention.

Referring to FIG. 2, the bit rate control apparatus 200 includes a similarity calculation unit 210, a group-based target bit amount determination unit 220, a block-based target bit amount determination unit 230, a QP calculation unit 240, and a QP adjustment unit 250.

The similarity calculation unit 210, the group-based target bit amount determination unit 220, the block-based target bit amount determination unit 230, and the QP calculation unit 240 function in the same manner as those described in FIG. 1 and thus will not be described in detail again.

The QP adjustment unit 250 adjusts the QP of the current macroblock to a value that is most approximate to the QP of the current macroblock calculated by the QP calculation unit 240 from among the values within a predetermined threshold value from an average QP of the previous frame.

For example, it is assumed that the average QP of macroblocks included in the previous frame is "10" and the QP adjustment unit 250 adjusts the QP within a range of "3", i.e., adjusts the QP to a value within "7-13". When the QP of the current macroblock calculated by the QP calculation unit 240 is "12", the QP adjustment unit 250 does not adjust the QP of the current macroblock. On the other hand, when the calculated QP is "15", the QP adjustment unit 250 adjusts the QP of the current macroblock to "13" that is most approximate to "15" from among the values "7-13".

Figure 3:
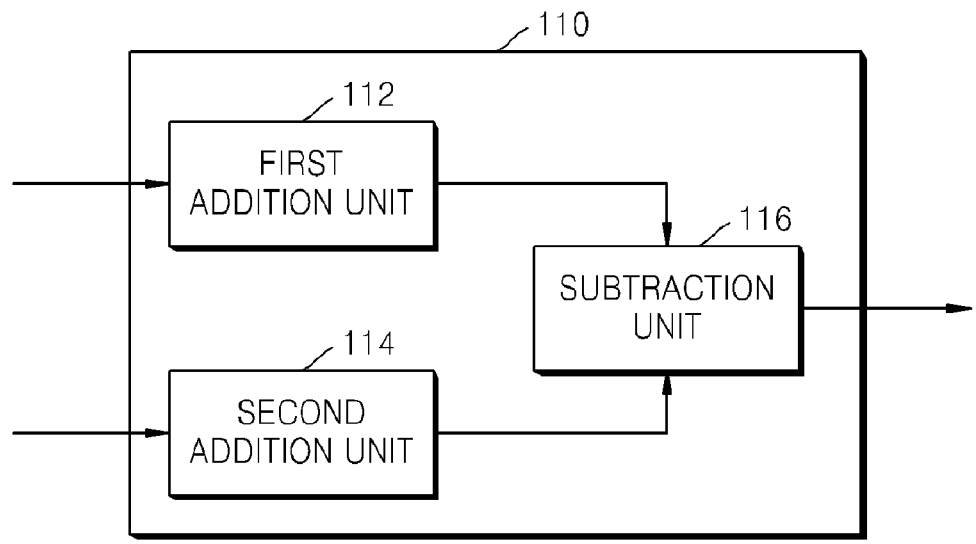
FIG. 3 is a detailed block diagram of a similarity calculation unit of FIG. 1.

FIG. 3 is a detailed block diagram of the similarity calculation unit 110 illustrated in FIG. 1.

Referring to FIG. 3, the similarity calculation unit 110 includes a first addition unit 112, a second addition unit 114, and a subtraction unit 116.

The first addition unit 112 calculates a first sum of the complexities of a plurality of macroblocks included in at least one block group that precedes the current block group. In other words, the first addition unit 112 sums up the complexities of all macroblocks that precede the current block group. The complexity of a macroblock means how complex is the macroblock, and can be obtained in various ways. For example, the complexity of a macroblock can be obtained using the gradient of the macroblock.

The gradient of a macroblock can be obtained in various ways, one of which is as follows:

$$Grad(m, n) = \sum_{i=0}^{15} \sum_{j=0}^{15} (p'(i, j) - p'(i-1, j) + p'(i, j) - p'(i, j-1)), \quad (1)$$

where $Grad(m,n)$ is the gradient of an $(m, n)^{th}$ macroblock, i.e., the gradient of a macroblock located $m^{th}$ in a horizontal line and $n^{th}$ in a vertical line.

It is assumed that a macroblock has a size of 16×16. Thus, the number of pixels included in the macroblock is 16×16 pixels. From among the pixels included in the current macroblock, the first pixel is defined as $p'(0,0)$ and the last pixel is defined as $p'(15,15)$.

First, the gradient of each of the pixels included in a macroblock is calculated. In the current exemplary embodiment of the present invention, the gradient of a pixel is calculated using the differences from adjacent pixels.

More specifically, a difference between a pixel value of a pixel $p'(i,j)$ and a pixel value of a pixel $p'(i-1,j)$ located to the left of the pixel $p'(i,j)$ is calculated and a first absolute value of the difference is obtained. In the same way, a difference between a pixel value of a pixel $p'(i,j)$ and a pixel value of a pixel $p'(i,j-1)$ located above the pixel $p'(i,j)$ is calculated and a second absolute value of the difference is obtained. A sum of the first absolute value and the second absolute value is defined as the gradient of the pixel $p'(i,j)$. Thus, the gradient of the current pixel is proportional to the difference between a pixel value of current pixel and a pixel value of another pixel that is adjacent to the current pixel.

After the gradients of all pixels included in the macroblock are calculated in this way, a sum of the calculated gradients is defined as the gradient of the macroblock. Thus, a large gradient of the macroblock means a large amount of change in the pixel values of the pixels included in the macroblock and thus means that the macroblock is a complex image and requires a large amount of bits for encoding.

Such calculation of the gradient of the macroblock is only an example. Thus, the complexity of the macroblock is not limited to the gradient of the macroblock and may be any value indicating the number of bits required for encoding the macroblock with the original display quality.

The second addition unit 114 calculates a second sum of the complexities of a plurality of macroblocks included in at least one block group of the previous frame, which corresponds to the at least one block group of the current frame. In other words, the second addition unit 114 calculates the second sum of the complexities of the macroblocks of the previous frame, which are located in positions corresponding to the macroblocks of the current frame used to calculate the first sum.

The subtraction unit 116 calculates a similarity using a difference between the first sum and the second sum. A large difference between the first sum and the second sum means that the video characteristic of the current frame and the video characteristic of the previous frame are much different, resulting in a low similarity. A small difference between the first sum and the second sum means that the video characteristic of the current frame and the video characteristic of the previous frame are similar to each other, thereby resulting in a high similarity.

Figure 4A:
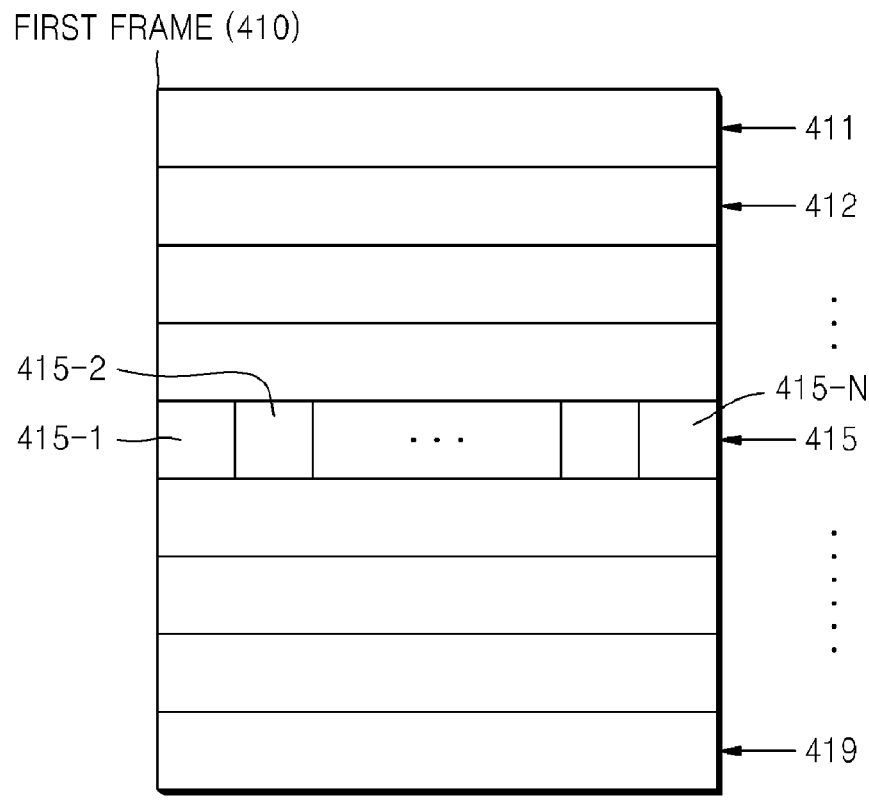
Figure 4B:
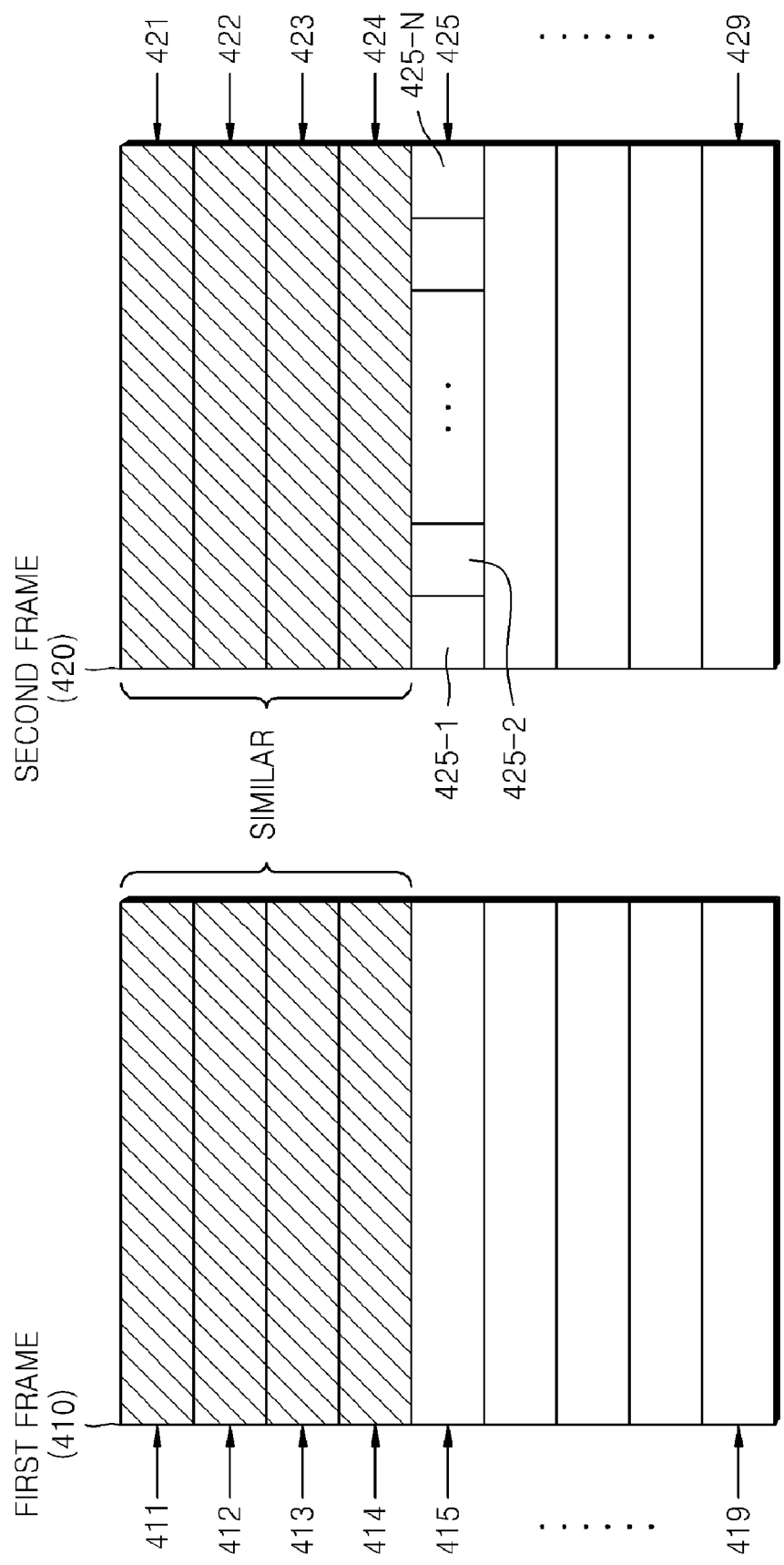

FIGS. 4A through 4C are diagrams for explaining bit rate control according to exemplary embodiments of the present invention.

FIG. 4A is a diagram for explaining assignment of target bit amounts to macroblocks included in a first frame 410.

Referring to FIG. 4A, the first frame 410 is to be encoded first and includes a plurality of block groups 411 through 419. Each of the block groups 411 through 419 includes a plurality of macroblocks. For example, the block group 415 includes N macroblocks 415-1 through 415-N.

Since the first frame 410 is to be encoded first, a video characteristic of the first frame 410 cannot be predicted using a previous frame. Thus, the same target bit amount is assigned to the block groups 411 through 419.

FIG. 4B is a diagram for explaining assignment of target bit amounts to macroblocks included in a second frame 420.

Referring to FIG. 4B, the second frame 420 is to be encoded second. In this case, a video characteristic of the second frame 420 is predicted using the first frame 410 and target bit amounts are assigned to the macroblocks included in the second frame 420 according to the prediction result.

For example, in order to assign a target bit amount to the block group 425 of the second frame 420, it is determined whether the video characteristic of the second frame 420 and the video characteristic of the first frame 410 are similar to each other. Even though the determination of whether the video characteristic of the second frame 420 and the video characteristic of the first frame 410 are similar to each other can be performed in various ways, it is performed using complexity in the current exemplary embodiment of the present invention. It is assumed that the complexities of a block group 421 through to a block group 424 of the second frame 420 are known by encoding the block group 421 through to the block group 424. Thus, a similarity is calculated by comparing the complexities of the block group 421 through to the block group 424 in the second frame 420 with the complexities of the block group 411 through to the block group 414 in the first frame 410. When a video characteristic of the block group 425 can be known as when the block group 425 is loaded in a memory before encoding and then encoded, the comparison may be performed on up to the block group 425. The calculation of the similarity has already been described with reference to FIG. 3.

When the video characteristics of the block group 421 through to the block group 424 in the second frame 420 are similar to those of the block group 411 through to the block group 414 in the first frame 410 and thus the similarity is greater than a predetermined threshold value, a previous frame is referred to in order to assign a target bit amount to the block group 425. For example, when the complexity of the first frame 410 is "100" and the complexity of the block group 425 of the second frame 420 is "10", "10/100" of the target bit amount assigned to the second frame 420 is assigned as the target bit amount of the block group 425.

Once the target bit amount of the block group 425 is determined, target bit amounts are assigned to the macroblocks 425-1 through 425-N included in the block group 425. When the complexities of the macroblocks 425-1 through 425-N included in the block group 425 are known, target bit amounts may be differentially assigned to the macroblocks 425-1 through 425-N in proportion to the known complexities. However, when the complexities of the macroblocks 425-1 through 425-N included in the block group 425 are not known, target bit amounts may be equally assigned to the macroblocks 425-1 through 425-N.

A QP is calculated based on the target bit amount of each of the macroblocks 425-1 through 425-N and the amount of use of a buffer, and the calculated QP can be adjusted by comparing the calculated QP with an average QP of macroblocks of the first frame 410. The adjustment of the QP has already been described with reference to FIG. 2, and thus, QPs are calculated for all macroblocks included in the second frame 420 in the same way.

FIG. 4C is a diagram for explaining assignment of target bit amounts to macroblocks included in a third frame 430.

Referring to FIG. 4C, the third frame 430 is to be encoded third. In this case, a video characteristic of the third frame 430 is predicted using the second frame 420 and target bit amounts are assigned to the macroblocks included in the third frame 430 according to the prediction result.

For example, in order to assign a target bit amount to a block group 435 of the third frame 430, it is determined whether the video characteristic of the third frame 430 is similar to that of the second frame 420. When video characteristics of a block group 431 through to a block group 434 in the third frame 430 are different from those of the block group 421 through to the block group 424 in the second frame 420 and thus meaning that the similarity is less than the predetermined threshold value, the similarity between the second frame 420 and the third frame 430 is lacking and thus the second frame 420 is not referred to any more.

In this case, target bit amounts may be equally assigned to the block group 435 and its following block groups based on the target bit amount of the third frame 430 and the amount of bits used for up to the fourth block group 434.

Figure 5:
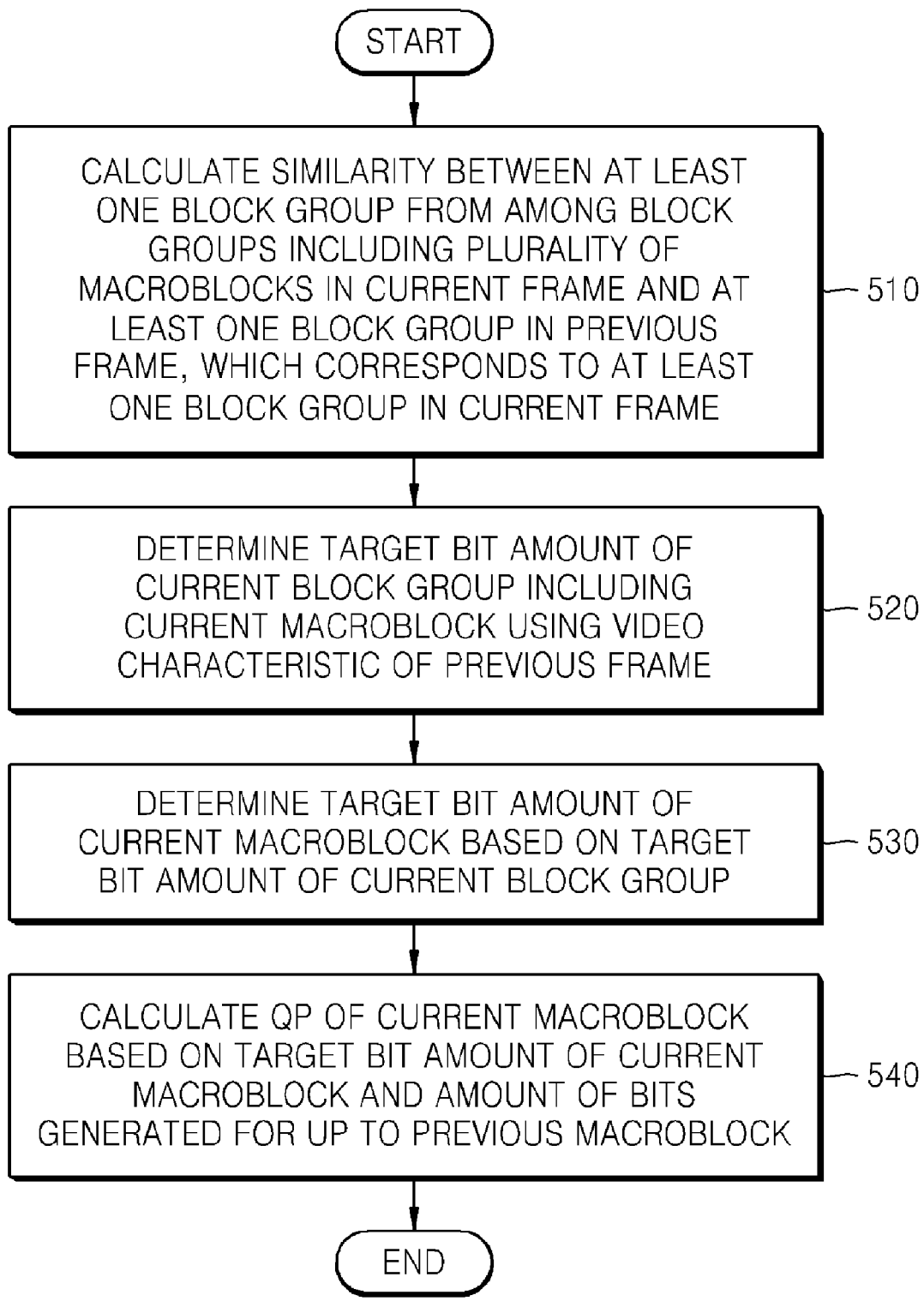
FIG. 5 is a flowchart illustrating a bit rate control method according to an exemplary embodiment of the present invention.

FIG. 5 is a flowchart illustrating a bit rate control method according to an exemplary embodiment of the present invention.

Referring to FIG. 5, in operation 510, a similarity between at least one block group from among block groups including a plurality of macroblocks of a current frame and at least one block group of a previous frame, which corresponds to the at least one block group of the current frame, is calculated.

In operation 520, when the similarity is greater than a predetermined threshold value, a target bit amount of a current block group including a current macroblock is determined using a video characteristic of the previous frame. The video characteristic of the previous frame means the complexity of the previous frame, and in this case, the complexity of the previous frame may be compared with the complexity of the current block group or a previous block group in order to determine the target bit amount of the current block group.

In operation 530, the target bit amount of the current macroblock is determined based on the target bit amount of the current block group.

In operation 540, a QP of the current macroblock is calculated based on the determined target bit amount of the current macroblock and the amount of bits generated for up to a previous macroblock.

Figure 6:
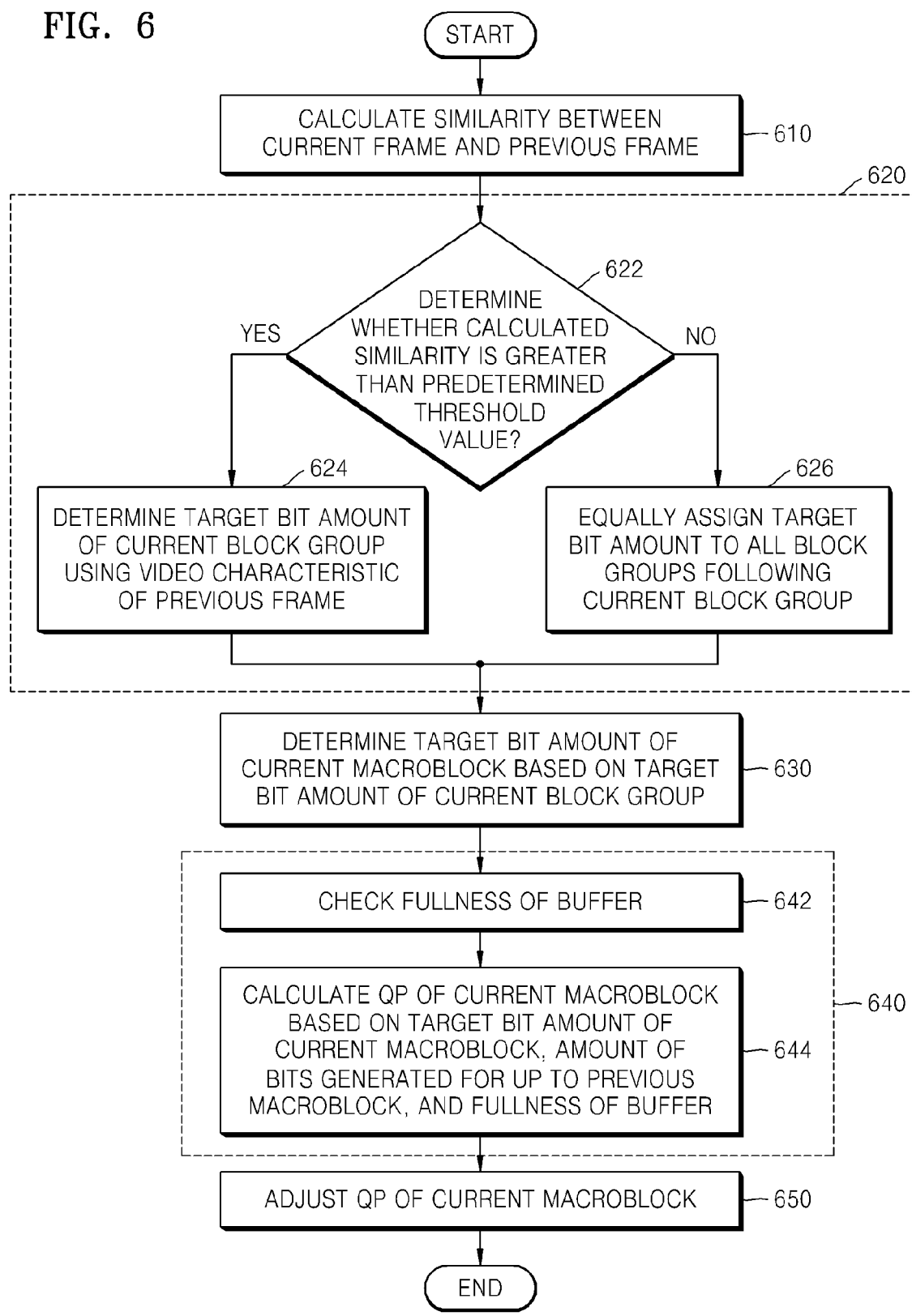
FIG. 6 is a flowchart illustrating a bit rate control method according to another exemplary embodiment of the present invention.

FIG. 6 is a flowchart illustrating a bit rate control method according to another exemplary embodiment of the present invention.

In operation 610, a similarity between a current frame and a previous frame is calculated.

In operation 620, it is determined whether the calculated similarity is greater than a predetermined threshold value.

When the calculated similarity is greater than the predetermined threshold value, a target bit amount of a current block group is determined using a video characteristic of the previous frame in operation 624. For example, the complexity of the previous frame may be compared with the complexity of a current block group including a current macroblock or a previous block group in order to determine the target bit amount of the current block group.

When the calculated similarity is less than the predetermined threshold value, target bit amounts are equally assigned to all block groups following the current block group without using the video characteristic of the previous frame in operation 626.

In operation 630, the target bit amount of the current macroblock is determined based on the target bit amount of the current block group determined in operation 624 or 626.

In operation 640, fullness of a buffer that temporarily store a generated bit-stream can be considered to calculate QP of the current macroblock.

In operation 642, the fullness of a buffer, for temporarily storing a generated bitstream, is checked.

In operation 644, a QP of the current macroblock is calculated based on the target bit amount of the current macroblock determined in operation 630, the amount of bits generated for up to a previous macroblock, and the fullness of the buffer is checked in operation 642.

In operation 650, the QP of the current macroblock is adjusted to a value that is most approximate to the QP calculated in operation 644 from among the values within a predetermined threshold value from an average QP of the previous frame. Operation 650 may be skipped and in this case, the QP calculated in operation 644 is finally determined as the QP of the current macroblock.

In FIG. 6, operations 610 and 630 correspond to operations 510 and 530 of FIG. 5 and operations 622 through 626 correspond to operation 520 of FIG. 5.

In FIG. 6, operations 642 and 644 correspond to operation 540 of FIG. 5.

As described above, according to the exemplary embodiments of the present invention, a bit rate is controlled by predicting a video characteristic of a current frame, and thus, an overflow and an underflow of a buffer, for storing a bitstream, are prevented, thereby transmitting high-quality and high-resolution video in real time.

Also, the exemplary embodiments of the present invention can be written as computer programs and can be implemented in general-use digital computers that execute the programs using a computer readable recording medium.

Examples of the computer readable recording medium include magnetic storage media (e.g., ROM, floppy disks, hard disks, etc.), optical recording media (e.g., CD-ROMs, or DVDs), and other storage media.

While the present invention has been particularly shown and described with reference to exemplary embodiments thereof, it will be understood by one of ordinary skill in the art that various changes in form and detail may be made therein without departing from the spirit and scope of the present invention as defined by the following claims.

What is claimed is:

1. A bit rate control method comprising:
    calculating a similarity between a first plurality of macroblocks including at least one block group that precedes a current block group of a current frame to be encoded, and a second plurality of macroblocks including at least one block group in a previous frame, which corresponds to the at least one block group in the current frame;
    determining a target bit amount of a current block group including a current macroblock using a video characteristic of the previous frame if the calculated similarity is greater than a predetermined threshold value;
    determining a target bit amount of the current macroblock based on the determined target bit amount of the current block group; and
    calculating a quantization parameter (QP) of the current macroblock based on the determined target bit amount of the current macroblock and an amount of bits generated for a previous macroblock.

2. The bit rate control method of claim 1, wherein the video characteristic of the previous frame is a complexity of the previous frame, and the determination of the target bit amount of the current block group includes comparing the complexity of the previous frame with one of a complexity of the current block group and a previous block group to determine the target bit amount of the current block group.

3. The bit rate control method of claim 2, wherein the determination of the target bit amount of the current block group includes calculating a ratio between the complexity of the previous frame and the complexity of the current block group and determining the target bit amount of the current block group according to the calculated ratio.

4. The bit rate control method of claim 1, further comprising adjusting the QP of the current macroblock to a value that is most approximate to the calculated QP of the current macroblock from among values within a predetermined threshold value from an average QP of the previous frame.

5. The bit rate control method of claim 1, wherein the calculation of the similarity includes:
    calculating a first sum of complexities of the first plurality of macroblocks;
    calculating a second sum of complexities of the second plurality of macroblocks; and
    calculating a difference between the first sum and the second sum.

6. The bit rate control method of claim 5, wherein the complexities of the first plurality of macroblocks is a gradient of the first plurality of macroblocks, and wherein the complexities of the second plurality of macroblocks is a gradient of the second plurality of macroblocks.

7. The bit rate control method of claim 1, wherein the first plurality of macroblocks, which is included in the current block group, are located in a same horizontal row in a same frame.

8. The bit rate control method of claim 1, wherein the determination of the target bit amount of the current macroblock includes determining some of the determined target bit amount of the current block group as the target bit amount of the current macroblock based on complexities of the first plurality of macroblocks, which is included in the current block group.

9. The bit rate control method of claim 1, wherein the calculation of the QP of the current block group includes calculating the QP of the current macroblock, wherein the QP is further based on a fullness of a buffer that temporarily stores a generated bitstream.

10. A bit rate control apparatus comprising:
  a similarity calculation unit which calculates a similarity between a first plurality of macroblocks including at least one block group that precedes a current block group of a current frame to be encoded, and a second plurality of macroblocks including at least one block group in a previous frame, which corresponds to the at least one block group in the current frame;
  a group-based target bit amount determination unit which determines a target bit amount of a current block group including a current macroblock which uses a video characteristic of the previous frame if the calculated similarity is greater than a predetermined threshold value;
  a block-based target bit amount determination unit which determines a target bit amount of the current macroblock based on the determined target bit amount of the current block group; and
  a quantization parameter (QP) calculation unit which calculates a QP of the current macroblock based on the determined target bit amount of the current macroblock and the amount of bits generated for up to a previous macroblock.

11. The bit rate control apparatus of claim 10, wherein the video characteristic of the previous frame is a complexity of the previous frame, and the group-based target bit amount determination unit compares the complexity of the previous frame with a complexity of the current block group or a previous block group to determine the target bit amount of the current block group.

12. The bit rate control apparatus of claim 11, wherein the group-based target bit amount determination unit calculates a ratio between the complexity of the previous frame and the complexity of the current block group and determines the target bit amount of the current block group according to the calculated ratio.

13. The bit rate control apparatus of claim 10, further comprising a QP adjustment unit which adjusts the QP of the current macroblock to a value that is most approximate to the calculated QP of the current macroblock from among the values within a predetermined threshold value from an average QP of the previous frame.

14. The bit rate control apparatus of claim 10, wherein the similarity calculation unit includes:
  a first addition unit which calculates a first sum of complexities of the first plurality of macroblocks;
  a second addition unit which calculates a second sum of complexities of the second plurality of macroblocks; and
  a subtraction unit which calculates a difference between the first sum and the second sum.

15. The bit rate control apparatus of claim 14, wherein the complexities of the macroblocks are gradients of the macroblocks.

16. The bit rate control apparatus of claim 10, wherein the macroblocks included in the block group are located in the same horizontal row in the same frame.

17. The bit rate control apparatus of claim 10, wherein the blockbased target bit amount determination unit determines some of the determined target bit amount of the current block group as the target bit amount of the current macroblock based on complexities of the first plurality of macroblocks, which is included in the current block group.

18. The bit rate control apparatus of claim 10, further comprising a buffer temporarily which stores a generated bitstream, wherein the QP calculation unit calculates the QP of the current macroblock further based on a fullness of the buffer.

19. A non-transitory computer-readable recording medium having recorded thereon a program for executing a bit rate control method, the method comprising:
  calculating a similarity between a first plurality of macroblocks including at least one block group that precedes a current block group of a current frame to be encoded, and a second plurality of macroblocks including at least one block group in a previous frame, which corresponds to the at least one block group in the current frame;
  determining a target bit amount of a current block group including a current macroblock using a video characteristic of the previous frame if the calculated similarity is greater than a predetermined threshold value;
  determining a target bit amount of a current macroblock based on the determined target bit amount of the current block group; and
  calculating a quantization parameter (QP) of the current macroblock based on the determined target bit amount of the current macroblock and an amount of bits generated for a previous macroblock.

* * * * *